United States Patent
Bohannon et al.

(10) Patent No.: US 12,151,818 B2
(45) Date of Patent: Nov. 26, 2024

(54) MODULAR CHANNEL-MOUNTED FURNITURE ATTACHMENT

(71) Applicant: Safran Cabin Inc., Huntington Beach, CA (US)

(72) Inventors: Ian Bohannon, Gainesville, TX (US); Gerardo Terriquez, Corinth, TX (US); Tyler Bragg, Temecula, CA (US); Lynette Cox, Clayton, CA (US); Craig Kimball, Encinitas, CA (US)

(73) Assignee: Safran Cabin Inc., Huntington Beach, CA (US)

( * ) Notice: Subject to any disclaimer, the term of this patent is extended or adjusted under 35 U.S.C. 154(b) by 105 days.

(21) Appl. No.: 17/928,236

(22) PCT Filed: Jun. 2, 2020

(86) PCT No.: PCT/US2020/035774
§ 371 (c)(1),
(2) Date: Nov. 28, 2022

(87) PCT Pub. No.: WO2021/247011
PCT Pub. Date: Dec. 9, 2021

(65) Prior Publication Data
US 2023/0219690 A1    Jul. 13, 2023

(51) Int. Cl.
*B64D 11/06* (2006.01)

(52) U.S. Cl.
CPC ............................. *B64D 11/0696* (2013.01)

(58) Field of Classification Search
CPC ............ B64D 11/0696; B64D 11/0639; B64D 11/0648
See application file for complete search history.

(56) References Cited

U.S. PATENT DOCUMENTS 3,196,121 A * 7/1965 Elliott .................. C09D 115/00
                                                524/417
5,072,961 A * 12/1991 Huppe .................. B62K 17/00
                                                280/288.4
(Continued)

FOREIGN PATENT DOCUMENTS

DE    102010046126 A1    3/2012
EP       3196121 A1      7/2017
(Continued)

OTHER PUBLICATIONS

International Patent Application No. PCT/US2020/035774, International Search Report and Written Opinion, dated Feb. 22, 2021.
(Continued)

*Primary Examiner* — Medhat Badawi
(74) *Attorney, Agent, or Firm* — Kilpatrick Townsend & Stockton LLP

(57) ABSTRACT

Described are crossbeam assemblies for installing a furnishing to a passenger compartment. The crossbeam assemblies can include a first structural member configured to span two floor-mounted channels in a passenger compartment, and at least two attachment elements that are slidingly connected with the first structural member. The attachment elements are repositionable along the first structural member to mate with the floor-mounted channels, and lockable to retain the first structural member with respect to the two floor-mounted channels when the first structural member is attached.

20 Claims, 7 Drawing Sheets

(56) References Cited

U.S. PATENT DOCUMENTS

| | | | | |
|---|---|---|---|---|
| 6,012,679 | A | * | 1/2000 | Auestad ............. B64D 11/0693 244/118.6 |
| 11,975,839 | B2 | * | 5/2024 | Glain ................. B64D 11/0606 |
| 2013/0144935 | A1 | * | 6/2013 | Valdetaro .............. H04L 63/029 709/203 |
| 2015/0202992 | A1 | * | 7/2015 | Cailleteau .............. B60N 2/015 297/248 |
| 2018/0215469 | A1 | * | 8/2018 | Uriu ........................ B60N 2/22 |
| 2020/0091820 | A1 | * | 3/2020 | Ripley ................. H02M 3/158 |
| 2021/0261197 | A1 | * | 8/2021 | Czinger ............... B62D 29/005 |
| 2023/0219690 | A1 | * | 7/2023 | Bohannon .......... B64D 11/0639 244/118.6 |

FOREIGN PATENT DOCUMENTS

| | | | |
|---|---|---|---|
| WO | 2013144935 | A2 | 10/2013 |
| WO | 2020091820 | A1 | 5/2020 |

OTHER PUBLICATIONS

European Application No. 20760628.6, Office Action mailed on Jul. 10, 2024, 4 pages.

* cited by examiner

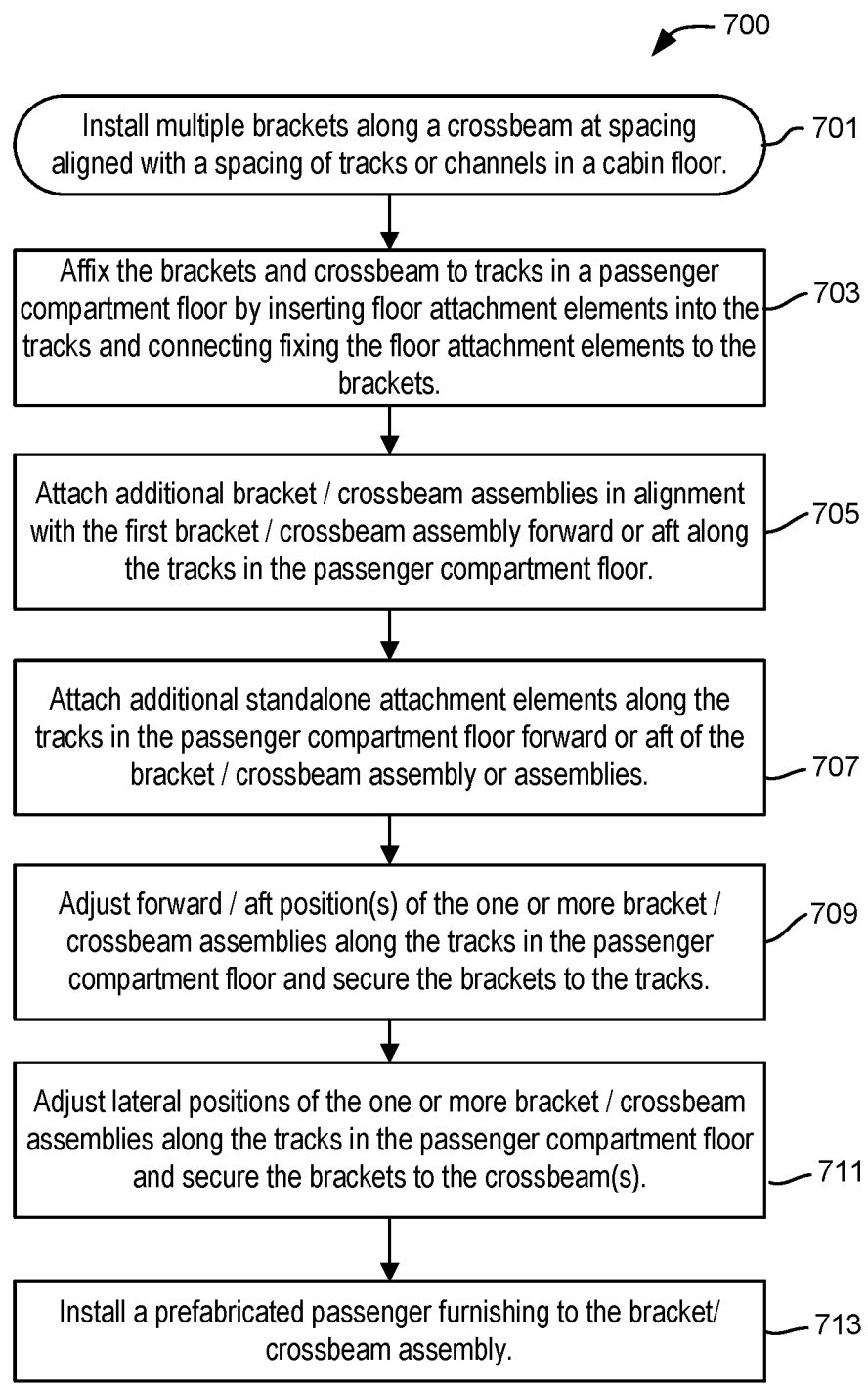

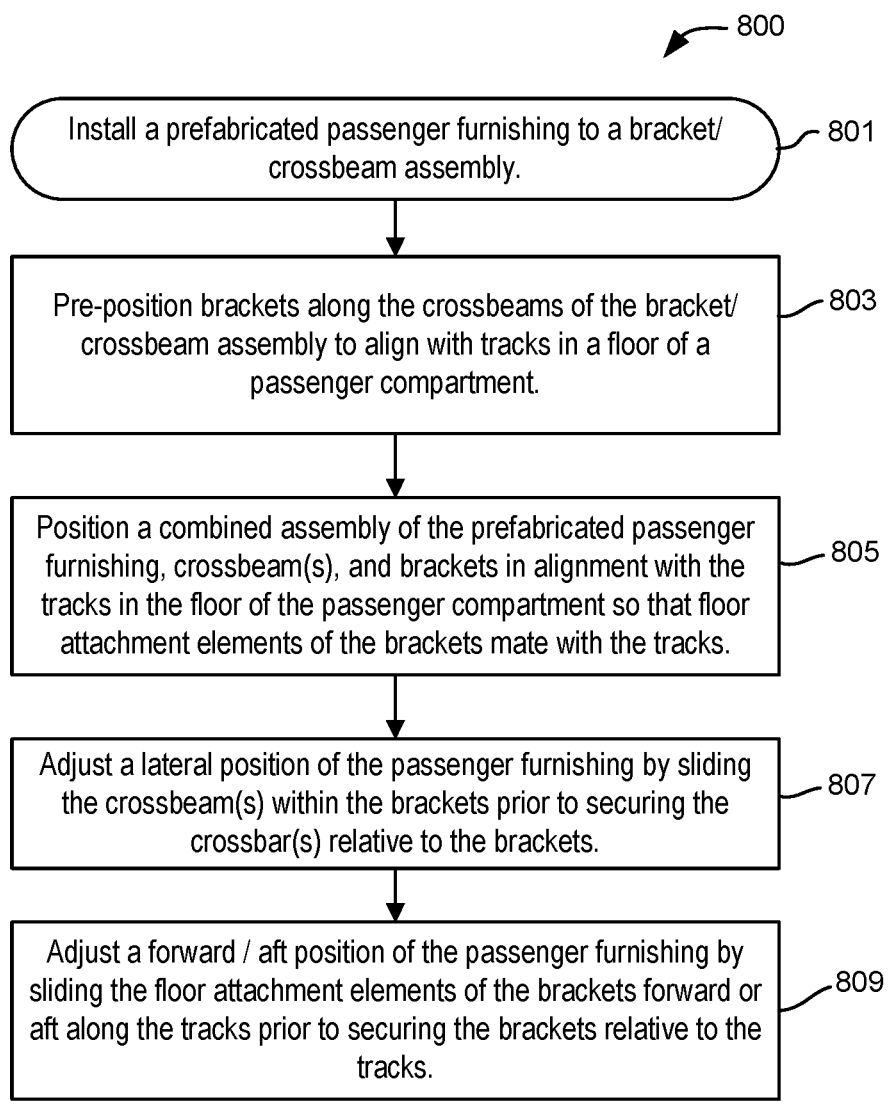

MODULAR CHANNEL-MOUNTED FURNITURE ATTACHMENT

FIELD OF THE INVENTION

The field of the invention relates to attachment mechanisms for passenger compartment furnishings.

BACKGROUND

In commercial aircraft, passenger safety and comfort are facilitated by providing structurally sound passenger furnishings, including seating arrangements and a wide variety of amenities. Structures can be provided within the passenger cabin that are directed to providing secure seating, supporting safety features, providing storage for flotation devices or oxygen, for providing convenient small-article storage, or for supporting media devices, both built-in and passenger-provided. Unlike ground-based transport, air transport must cope with higher speeds and more limited space and weight constraints, and passenger aircraft may be in service through multiple iterations of improvements in passenger seat and amenity designs. Therefore, not only must aircraft furnishings be lightweight, safe, and secure; they should also be adaptable to multiple layouts and be movable without incurring excess costs or requiring significant layout changes in any given passenger cabin. To that end, improvements in the underlying structures that support passenger amenities are desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a crossbeam assembly for mounting a passenger compartment furnishing can include a first structural member configured to span two floor-mounted channels in a passenger compartment, and at least first and second attachment elements that are slidingly connected with the first structural member and repositionable along the first structural member to attach to the two floor-mounted channels. Various embodiments of crossbeam assemblies can include more than two attachment elements for mounting crossbeam assemblies across three or more floor-mounted channels, and can include additional crossbeam/attachment element assemblies arranged in parallel with each other at predetermined spacing in a forward/aft direction. In addition, various embodiments of crossbeam assemblies can include crossbeams of differing lengths, optionally having more or fewer attachment elements, for accommodating a variety of passenger compartment furnishing configurations.

According to certain embodiments of the present invention, a passenger compartment furnishing can include a crossbeam assembly (as described above) mounted to a furnishing body for connecting the passenger furnishing to channels in a floor of a passenger compartment. According to various embodiments, the furnishing body can be mounted at least to a first structural member, and can include one or more panels configured to complement or circumscribe a portion of a passenger seat.

According to certain embodiments of the present invention, a method for installing a passenger compartment furnishing can include, using any suitable embodiment of the crossbeam assemblies described above: positioning the first and second attachment elements along the first structural member to match a spacing of two floor-mounted channels of a passenger compartment, attaching the crossbeam assembly to two (or more) floor-mounted channels via the first and second attachment elements, and mounting the passenger compartment furnishing to the first structural member. According to various embodiments, a lateral position of the structural member (and/or passenger furnishing) can be adjusted prior to securing the attachment element(s) to the structural member. According to various embodiments, a forward/aft position of the structural member can be adjusted prior to securing the attachment element(s) to the channels in the passenger compartment. In some embodiments, the attachment elements and structural members can be attached to the passenger compartment floor via the channels prior to mounting the passenger furnishing to the structural members, but in some embodiments, the order of attachment can be reversed and the passenger furnishing, structural members, and attachment elements can be assembled and attached to the channels in the passenger compartment as a modular unit, and the positioning of the attachment elements adjusted to mate with the channels.

BRIEF DESCRIPTION OF THE DRAWINGS

FIG. 7 is a process flow diagram illustrating an example process for installing a passenger furnishing using a modular assembly for connecting a passenger furnishing to a cabin floor, according to various embodiments.

FIG. 8 is a process flow diagram illustrating a second example process for installing a passenger furnishing using a modular assembly for connecting a passenger furnishing to a cabin floor, according to various embodiments.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide modular assembly for connecting a passenger furnishing to a cabin floors for installing passenger furnishings, passenger seats, and other fixed amenities to a channels in an aircraft cabin floor. While the modular assembly for connecting a passenger furnishing to a cabin floors are discussed for use with aircraft passenger furnishings, they are by no means so limited. Rather, embodiments of the modular assembly for connecting a passenger furnishing to a cabin floors may be used with a wide variety of channel-mounted amenities of any type or otherwise as desired, and in a variety of passenger cabin arrangements for alternative conveyances.

Figure 1:
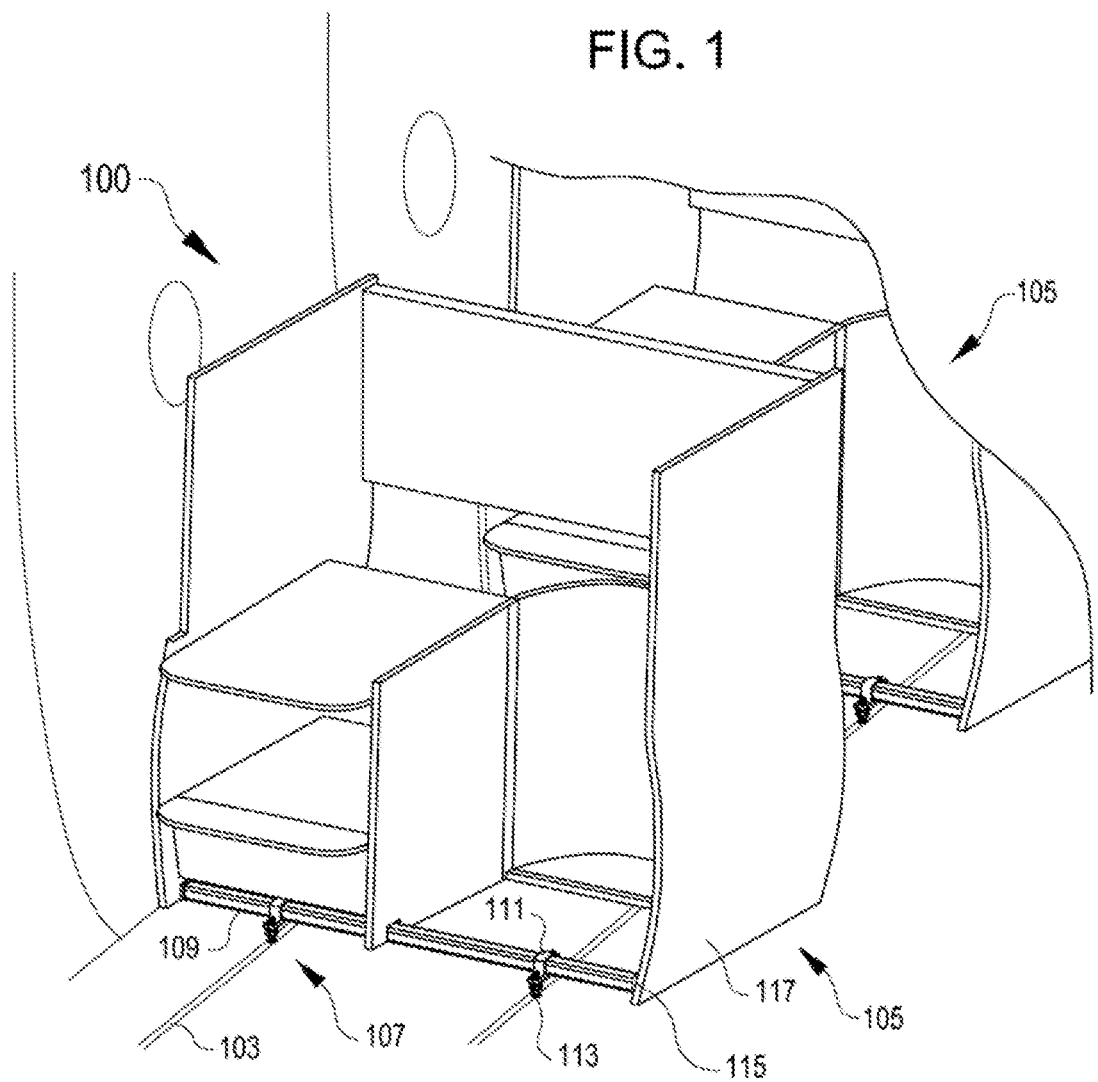
FIG. 1 is a perspective view of a passenger cabin including an arrangement of passenger furnishings connected with channeled floor supports in the cabin, according to certain embodiments of the present invention.

According to certain embodiments of the present invention, as shown in FIG. 1, an arrangement of passenger furnishings 100 includes at least one, often multiple, passenger furnishing assemblies 105 that are connected to the passenger cabin by an arrangement of floor-mounted channels 103. The floor-mounted channels 103 can be open U-channel channels or comparable, can be closed channels with periodically spaced mounting features or holes for receiving attachments, or can be any other suitable form of channel. Floor-mounted channels 103 are a common form of floor-mounted structural support in the aircraft industry, however, the exact spacing and the type of channel vary significantly between different airframes and between the customized floorplans prepared for different airlines. Existing passenger furnishings are designed based on known floorplans in order to attach directly to the passenger cabin floor or to preassembled attachment means that are positioned with fixed, predetermined spacing. As a result, existing passenger furnishings are not readily replaceable and are not necessarily standardized between different airframes or cabin designs.

According to embodiments of the present disclosure, as shown in FIG. 1, passenger furnishing assemblies 105 include modular attachment mechanisms 107 that include a first structural member 109 (e.g., a crossbeam) that can be positioned intersecting the floor-mounted channels 103 and mounted to the floor-mounted channels via attachment elements 111 (e.g., brackets) connected to the floor-mounted channels by floor connectors 113. The structural members 109 include mounting elements 115 that connect the structural members with the body 117 of each passenger furnishing assembly 105. Several specific embodiments of the attachment elements 111 and floor connectors 113 are disclosed herein. In general, attachment elements 111 are movable along a length of each structural member 109, allowing the attachment elements 111 to be positioned at any suitable spacing with respect to each other along the structural member, and then allowing the structural member 109 to be placed at any suitable offset with respect to the floor-mounted channels 103 to which the attachment elements are mounted.

The passenger furnishing assemblies 105, including passenger furnishing body 117 and the modular attachment mechanisms 107, may be formed of materials including but not limited to aluminum, stainless steel, aramid fibers, polycarbonate, polypropylene, other metallic materials, composite materials, or other similar materials, or any suitable combination of the above materials. The particular passenger furnishing assemblies 105 illustrated herein are shown as examples only, and the modular attachment mechanisms 107 are compatible with a wide variety of passenger furnishings, including but not limited to: simple passenger seat shrouds; complex passenger seat enclosures that can include multimedia entertainment systems, tray tables, or similar amenities; multi-use stations such as galley furnishings; passenger seating arrangements; or any other suitable fixture that can be secured to an aircraft cabin by way of floor-mounted channels or tracks. The strength of the modular attachment mechanisms 107 can be selected based on the physical dimensions and weight of the passenger furnishing assembly, but is generally configured to support the passenger furnishing assembly against a potential forward load of 9 g acceleration, and a downward load of at least 8.8 g acceleration.

Figure 2:
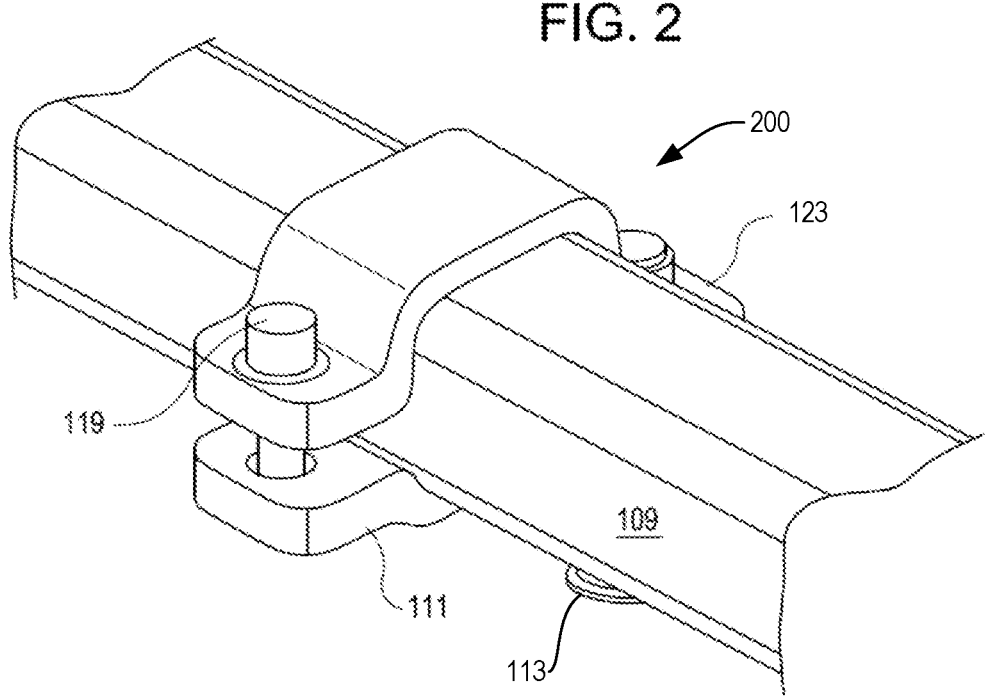
FIG. 2 is a perspective view of a first example connecting mechanism for the arrangement of passenger furnishings of FIG. 1, in accordance with various embodiments.

FIG. 2 is a perspective view of a first example connecting mechanism 200 for the arrangement of passenger furnishings of FIG. 1, in accordance with various embodiments. The connecting mechanism 200 includes an attachment element 111 shaped to receive the structural member 109. The structural member 109 can be adapted to many cross-sectional shapes, including (as shown) a rounded square configuration, but also including round, elliptical, rectangular, triangular, flat or channeled (e.g. shaped like a C-beam, L-beam, T-beam, or I-beam) or other suitable cross-sections, including both rounded and angular designs. According to various embodiments, the structural member 109 is an extruded component having a consistent cross-sectional shape along its length. According to some embodiments, e.g. where a singular structural member 109 is the attachment means for supporting a passenger furnishing, a cross section that prevents rotation with respect to attachment elements 111 may be preferred. For embodiments where multiple spaced-apart structural members 109 are used, cross sections that allow rotation with respect to the attachment elements 111 can be permitted, and may be advantageous for providing enhanced strength relative to weight.

The attachment element 111 includes, on one side, a securing bolt 119 that can be tightened to rigidly connect the attachment element to the structural member 109 at any suitable position along the structural member. When loosened, the securing bolt 119 can permit the attachment element 111 to open sufficient to allow adjustment of the structural member, e.g., for adjusting the position of a passenger furnishing (105, FIG. 1) from side to side, or for adjusting the spacing of multiple attachment elements along the same structural member. The attachment element 111 further includes a footing 123 that is attached to a floor connector 113, and is shown in further detail in FIG. 3.

Figure 3:
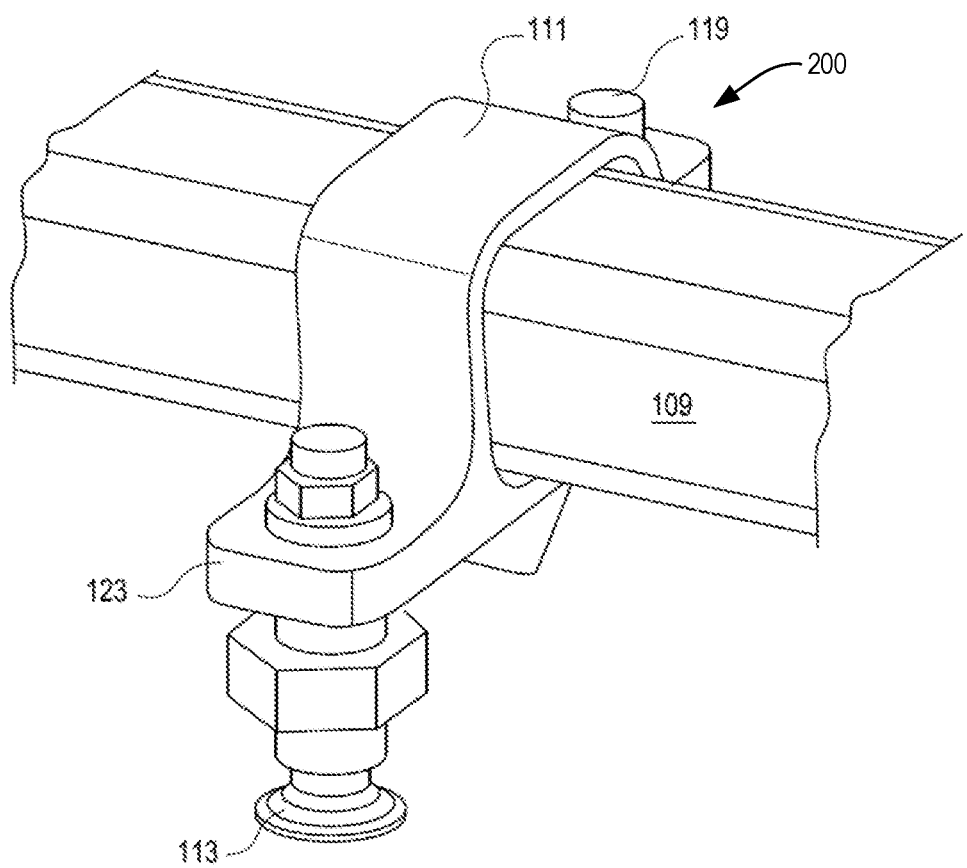
FIG. 3 is a second perspective view of the example connecting mechanism shown in FIG. 2, in accordance with various embodiments.

FIG. 3 is a second perspective view of the example connecting mechanism shown in FIG. 2, in accordance with various embodiments, illustrating floor connector 113 in further detail. The floor connector 113 can be any suitable bolt or screw assembly that is sized to attach to the floor-mounted channels 103 described above with reference to FIG. 1. For example, according to some embodiments, the floor connector 113 can be a flanged bolt that connects with a hole or channel in the floor-mounted channels 103 and is attached at a predefined spacing to the footing 129 of the attachment element 111 by way of one or more nuts. According to various other embodiments, the floor connector 113 can be any other suitable bolt, a screw that connects into one of the floor-mounted channels 103, a rivet, or an adhesive connector.

Figure 4:
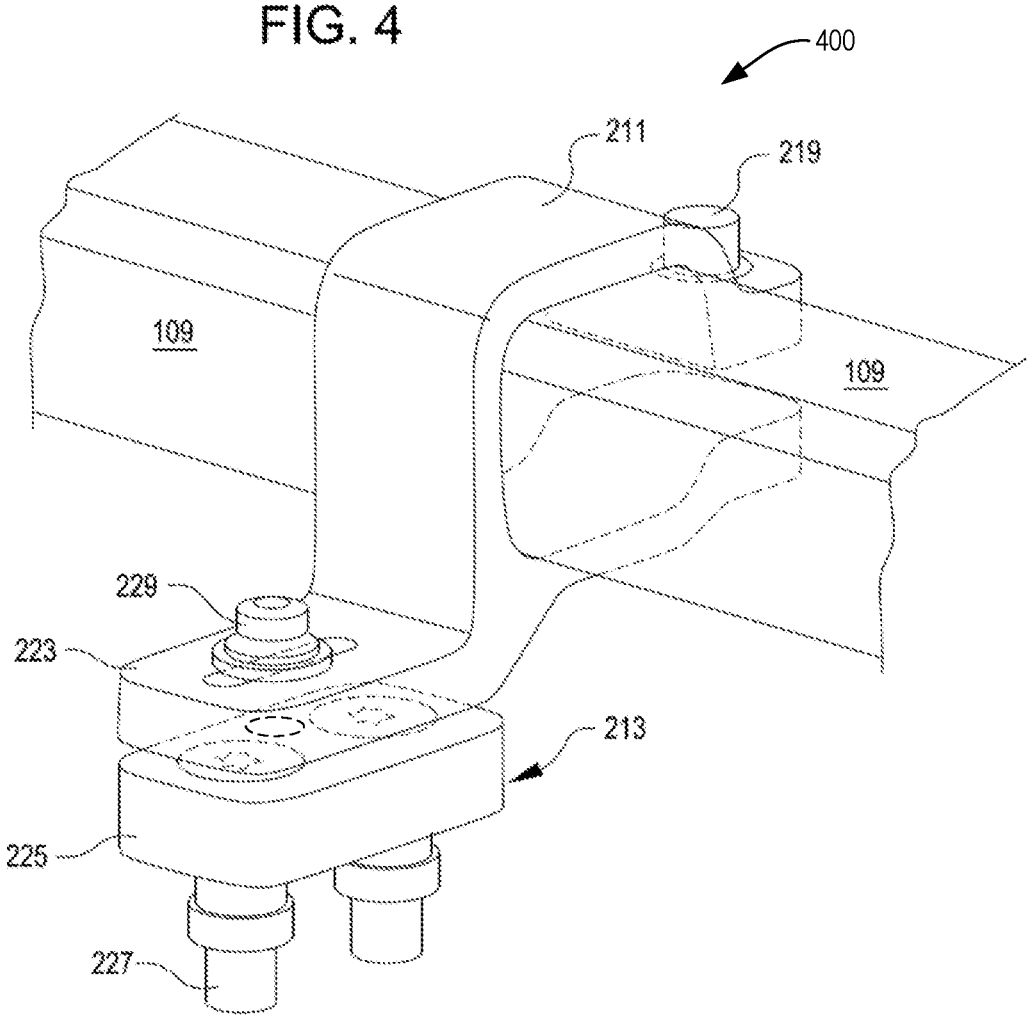
FIG. 4 is a perspective view of a second example connecting mechanism for the arrangement of passenger furnishings shown in FIG. 1, in accordance with various embodiments.

More sophisticated alternatives to floor connector 113 can also be used, for example, FIG. 4 is a perspective view of a second example connecting mechanism 400 for the arrangement of passenger furnishings shown in FIG. 1, in accordance with various embodiments. The connecting mechanism 400 includes an attachment element 211 shaped to attach to one of the modular structural members 109 in a similar manner to attachment element 111 (FIGS. 1-3). The attachment element 211 can be tightened to fixedly attach to the structural member 109 via, e.g., a securing bolt 219. When loosened, the securing bolt 219 can permit the attachment element 211 to open sufficient to allow adjustment of the structural member, e.g., for adjusting the position of a passenger furnishing (105, FIG. 1) from side to side, or for adjusting the spacing of multiple attachment elements along the same structural member. The attachment element 211 further includes a footing 223 that is attached to a floor connector assembly 213.

The floor connector assembly 213 includes an attachment block 225 that is shaped to interface with a floor-mounted channel (e.g., channel 103, FIG. 1) and secured to each other and in place by expansion bolts 227. The footing 223 of the attachment element 211 can be mounted to the floor connector assembly 213 by any suitable connector 229, e.g., bolts, screws, rivets, adhesive or chemical fasteners, or the like. According to some embodiments, the floor-mounted channels 103 can include individual bores that the bolts 227 pass through in order to secure the floor connector assembly 213 in position. According to various other embodiments, the floor-mounted channels can include a channel in which bolts 227 attach and expand when tightened to fix the floor connector assemblies 213 in position along the floor-mounted channels. According to various other embodiments, the floor-mounted channels can include a hybrid construction of a continuous channel with discrete features (e.g., an open track with discrete cutouts) sized to receive the floor connector assemblies 213 at discrete locations or at locations along the continuous channel.

Figure 5:
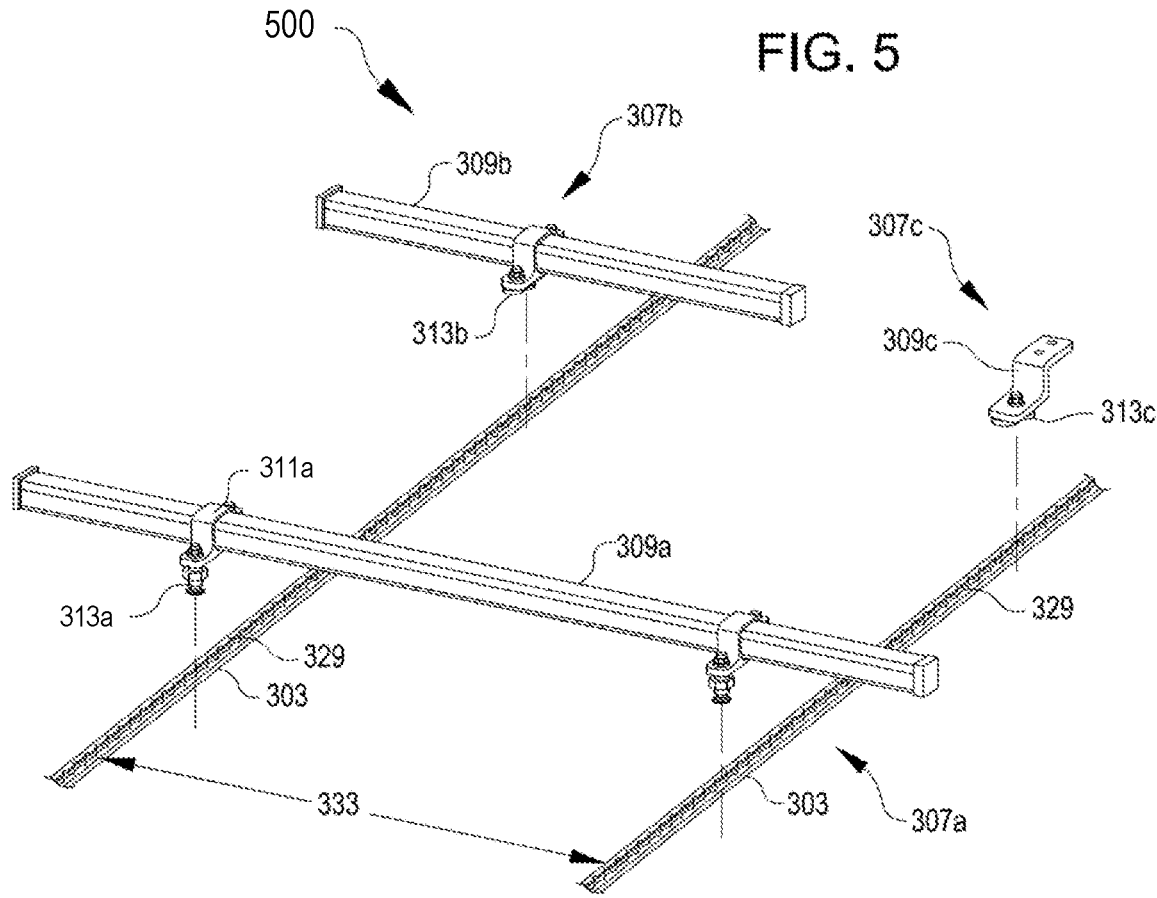
FIG. 5 is a perspective view of a first example of a modular assembly for connecting a passenger furnishing to a cabin floor for passenger furnishings like those shown in FIG. 1, in accordance with various embodiments.

FIG. 5 is a perspective view of a first example of a modular assembly 500500 for passenger furnishings like those shown in FIG. 1, in accordance with various embodiments. The modular assembly 500 is configured to attach to a series of floor-mounted channels 303, shown here with an open track with a series of connected mounting openings 329. It will be understood that any of the embodiments described above suitable for use with floor-mounted channels 103 (FIGS. 1-4) can be used in conjunction with floor-mounted channels 303, and vice versa.

The modular assembly 500 includes at least a first connecting assembly 307a that includes one structural member 309a that is sized to pass across at least two parallel floor-mounted channels 303, and which can include further attachment elements (not shown) for supporting any suitable passenger cabin fixture. This first structural member 309a has attached two attachment elements 311a, which can be configured similar to attachment elements 111 (FIGS. 1-3), 211 (FIG. 4), or can be functionally comparable. In use, the attachment elements 311 attached to the first structural member 309a can be connected to each of the two parallel floor-mounted channels 303 via floor connector assemblies 313a-c, thereby securing the first structural member 309a relative to the floor of the passenger cabin.

The exact spacing of the attachment elements 311a connected to the first structural member 309a can be varied in order to accommodate the spacing 333 of the floor-mounted channels 303, which vary between airframes and individual cabin layouts. According to some embodiments, the spacing 333 can be between adjacent floor-mounted channels 303, or between floor-mounted channels in different aisle regions of the airframe (e.g., bridging from closely-spaced channels near the sides vs. near the center of an airframe). Attachment elements 311a can be spaced as close as about 2.5 cm from each other, and may be used at that distance in order to mount passenger furnishings to closely spaced floor-mounted channels 303. Attachment elements 311a may be spaced according to standard channel spacing of common carriers, e.g., about 55 cm or 22.04". Alternatively, attachment elements 311a can be spaced father apart in order to support larger passenger furnishings, or to support passenger furnishings across more widely spaced floor-mounted channels. For example, attachment elements 311a may be spaced as far apart as the entire width of the central floor-mounted channels (which can be, for some airframes, approximately 135 cm, or 66"), across multiple channels or sets of channels, or may be spaced closer together for installation on smaller regional aircraft. According to some embodiments, the attachment elements 311a can be spaced father apart than the spacing of adjacent floor-mounted channels 303 in order to accommodate mounting the structural member 309a at an angle (non-perpendicular) to the floor-mounted channels.

Many supported types of passenger furnishings can be attached to the floor of a passenger cabin using one or multiple floor-mounted channels 303 in conjunction with one crossbar 309a or via multiple crossbars having similar dimensions and attached in the same way forward or aft of the crossbar. According to some embodiments, passenger furnishings can be attached to the floor of the passenger cabin using at least one long crossbar 309a that spans two or more of the floor-mounted channels 303, in conjunction with additional and more limited attachment means including, but not limited to, additional crossbars having shorter or longer dimensions, or by direct attachment mechanisms that do not involve crossbars. For example, as shown in FIG. 5, a modular assembly 500 can include a more limited, second connecting assembly 307b that includes a second, shorter structural member 309b that can cross fewer floor-mounted channels 303 than the first, long structural member 309a. The second structural member 309b is shown crossing a singular floor-mounted channel 303 and positioned aft of the first, long structural member 309a. The second structural member 309b is attached to the singular floor-mounted channel 303 via an attachment element 311b and attached floor connector assembly 313b. Various combinations of long crossbars (first structural member 309a) and short crossbars (second structural member 309b) can be used to form a modular connecting substructure for passenger furnishings that do not require support over an entire area that would otherwise be supported by a pair of long crossbars, or that have components that extend to close to the passenger compartment floor to allow clearance for crossbars underneath the entire area covered by the passenger furnishing. For similar reasons, the modular assembly 500 can also include standalone connecting assemblies 307c that include standalone attachments 309c that can be mounted to one of the floor-mounted channels 303 and attached directly to the passenger furnishings without intervening crossbars. Floor connector assembles 313b and 313c can resemble the floor connector assemblies 313a described above, or can be configured differently. For example, according to various embodiments, floor connector assembles 313b and 313c are shaped to mate with one or more of the openings 329 along the conduits 303 so that these floor connector assemblies can be fixed at discrete locations along the conduits, whereas floor connector assemblies 313a can be configured with an expansion bolt or similar connector that permits an installer to slide the first structural member 309a forward or aft along the conduits 303 before tightening the floor connector assemblies to fix the first structural member in place. According to some embodiments, the floor connector assemblies 313 can slidingly mate with the two floor-mounted channels in an unsecured configuration that allows for fine adjustment and placement, and to rigidly mate with the two floor-mounted channels when transitioned to a secured configuration (e.g., tightened or expanded). Alternatively, the floor connector assemblies 313 can mate with the channel 303 at discrete positions (e.g., mounting holes, openings, or the like) and can be secured in position once placed at the desired position.

Figure 6:
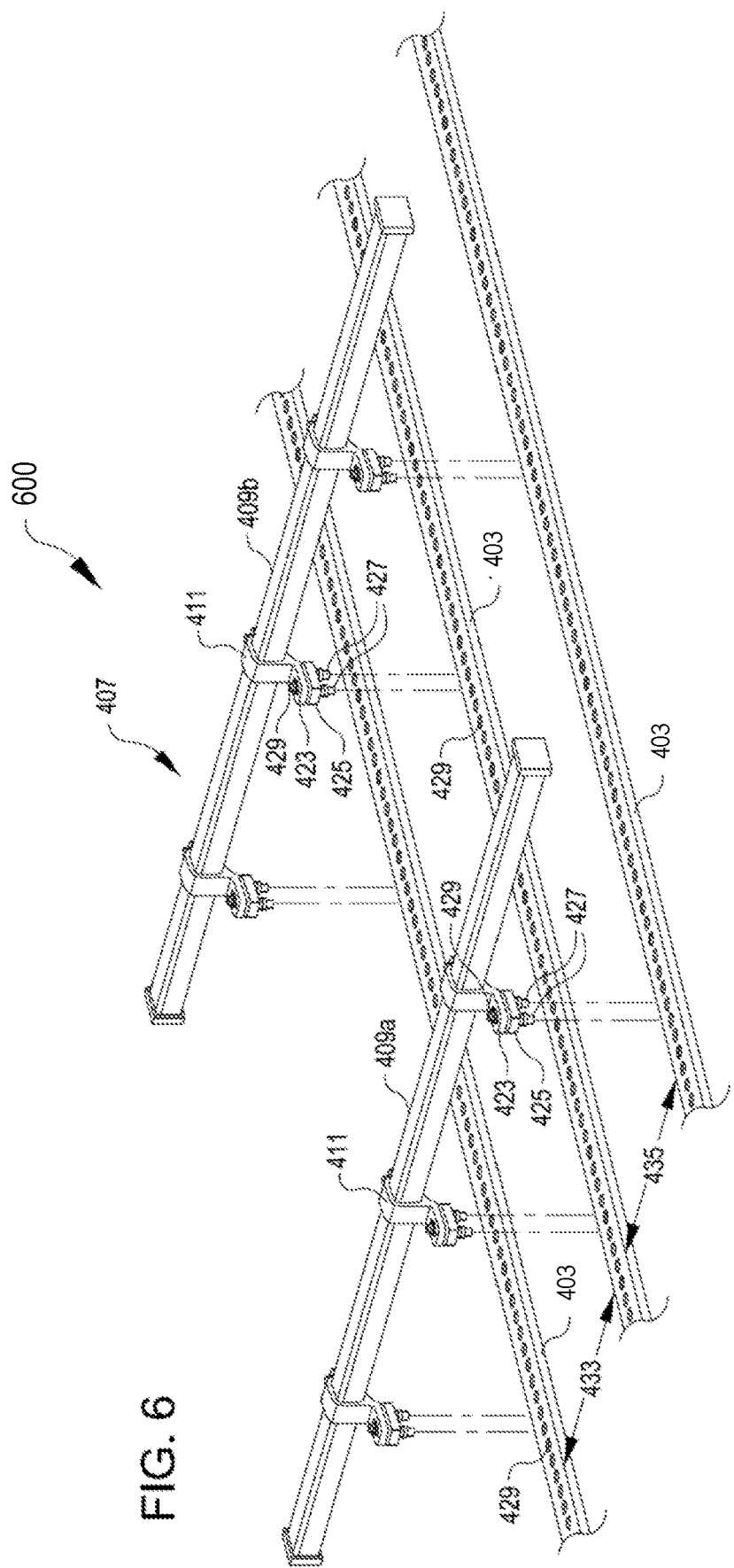
FIG. 6 is a perspective view of a second example of a modular assembly for connecting a passenger furnishing to a cabin floor for passenger furnishings like those shown in FIG. 1, in accordance with various embodiments.

According to various embodiments, modular assemblies for installing passenger furnishings into passenger compartments can include floor-mounted channels with regularly spaced holes (e.g., continuous channels 303 with openings 329, FIG. 5), or floor-mounted channels that include other attachment means, such as channels with a continuous open track, rails with discrete mounting holes, or other suitable fastening means. FIG. 6 is a perspective view of a second example of a modular assembly 600 for installing passenger furnishings like those shown in FIG. 1, in accordance with various embodiments.

The modular assembly 600 includes one or multiple connecting assemblies 407 that each include one structural member 409 that is sized to pass across at least two parallel floor-mounted channels 403, or optionally any suitable number of parallel floor-mounted channels. Each structural member 409 can include further attachment elements (not shown) that attach to the structural member for supporting any suitable passenger cabin fixture such as, but not limited to, passenger furnishing 105 (FIG. 1). Each one of the structural members 409 is supported by and attached to a series of attachment elements 411, which can be configured similar to attachment elements 111 (FIGS. 1-3), 211 (FIG. 4), 311a-c (FIG. 5) or can be functionally comparable. In use, the attachment elements 411 attached to each structural member 409 can connect the structural members to any suitable number of the parallel floor-mounted channels 403 via floor connector assemblies 413, thereby securing the structural members to the floor of the passenger cabin.

The exact spacing of the attachment elements 411 connected to each structural member can be varied in order to accommodate the spacing 433, 435 between adjacent floor-mounted channels 403, which can vary across the width of the cabin, between different airframes, and between cabin layouts even in the same airframe. Attachment elements 411 can be spaced as close as about 2.5 cm from each other, and may be used at that distance in order to mount passenger furnishings to closely spaced floor-mounted channels 403. Attachment elements 411 may be spaced according to standard channel spacing of common carriers, e.g., about 55 cm or 22.04" (for the A350). Alternatively, attachment elements 411 can be spaced father apart in order to support larger passenger furnishings, or to support passenger furnishings across more widely spaced floor-mounted channels. For example, attachment elements 411 may be spaced as far apart as the entire width of the central floor-mounted channels (which is approximately 135 cm, or 66", on the A350), across multiple channels or sets of channels, or may be spaced closer together for installation on smaller regional aircraft. According to some embodiments, the attachment elements 411 can be spaced father apart than the spacing of adjacent floor-mounted channels 403 in order to accommodate mounting the structural member 409 at an angle (non-perpendicular) to the floor-mounted channels.

The modular assembly 600 utilizes floor connector assemblies 413 similar to floor connector assemblies 213 shown in FIG. 4, in which each floor connector assembly 413 includes an attachment block 425 shaped to interface with a floor-mounted channel 403, secured in place along the respective channel to which the floor connector assembly is attached by expansion bolts 427 and connected to the attachment elements 411 by a connector 429. However, floor connector assemblies 413 can be replaced other suitable connector assemblies described above, e.g., floor connector assemblies 113 (FIG. 1), 213 (FIG. 4), 313 (FIG. 5), or other suitable connector assemblies. Floor connector assemblies 413 are shown connected to channels 403 that have discrete mounting holes 429, but can be installed via similar connectors to channels that have a continuous lengthwise track, or to channels having a modified track with periodic openings (e.g., channels 303 and openings 329, FIG. 5). According to some embodiments, the floor connector assemblies 413 can slidingly mate with the two floor-mounted channels in an unsecured configuration that allows for fine adjustment and placement, and to rigidly mate with the two floor-mounted channels when transitioned to a secured configuration (e.g. tightened or expanded). Alternatively, the floor connector assemblies 413 can mate with the channel 403 at discrete positions (e.g., mounting holes, openings, or the like) and can be secured in position once placed at the desired position.

FIG. 7 is a process flow diagram illustrating an example process 700 for installing a passenger furnishing using a modular assembly for connecting a passenger furnishing to a cabin floor, according to various embodiments. In the installation process 700 at 701, attachment elements (e.g., brackets for receiving the crossbars and having floor attachment elements) can be installed along a crossbeam for connecting with channels in a passenger cabin floor. The brackets can be attached at a distance from one another that matches the separation between channels in the cabin floor, however, the exact spacing may be adjusted upon installation as, generally, the brackets are movable along the crossbeam (or the crossbeam is movable when loosely installed in the brackets). Next, at 703, floor attachment elements of the brackets attached to the crossbeam can be inserted into the channels in the passenger cabin floor and fixed in place along the channels. According to some embodiments, affixing the floor attachment elements to the channels includes inserting a connector of each floor attachment element into a slot or hole among a series of spaced apart slots or holes along a length of each channel. See, e.g., FIG. 5. These embodiments result in a large but finite set of discrete attachment positions at which the passenger furnishing can be installed within the passenger cabin, and attachment at a discrete slot or hole along each channel can reduce the amount of tightening necessary to rigidly secure the passenger furnishing at a particular location. According to various other embodiments, affixing the floor attachment elements to the channels includes clamping each floor attachment element to a continuous slot or opening in one of the channels. See, e.g., FIG. 6. Suitable force to rigidly affix the floor attachment elements can be achieved using a bolt, screw, or other suitable clamping member or assembly such as, but not limited to, a block and bolt assembly such as floor connector assembly 213 (FIG. 4). These embodiments result in a fully adjustable set of attachment positions at which the passenger furnishing can be installed within the passenger cabin.

In the installation process 700 at 705, any suitable number of additional crossbeams can be attached to the channels at predetermined distances forward or aft of the first crossbeam via additional sets of brackets, according to any of the specific methods described above. In some embodiments, at 707, additional standalone attachment elements can be attached to the channels forward or aft of any one of the crossbeams and aligned for supporting specific elements of a passenger furnishing that are not compatible with a crossbeam. See, e.g. standalone connecting assemblies 307c in FIG. 5, or similar. According to some embodiments of the process 700, at 709, the brackets and/or standalone attachment elements can be adjusted in position forward or aft after installation to align with a required final location suitable for supporting the passenger furnishing before the floor attachment elements thereof are tightened to rigidly fix the modular assembly for connecting a passenger furnishing to a cabin floor to the cabin floor. In the process 700, at 711, crossbeams attached to the brackets can be adjusted in a direction orthogonal to the channels in the cabin floor to align with the required final location suitable for supporting the passenger furnishing before the brackets are tightened to rigidly connect the crossbeams with the cabin floor.

According to various embodiments of the process 700, at 713, when the modular assembly for connecting a passenger furnishing to a cabin floor is fixed to the cabin floor, a passenger furnishing that includes prefabricated components configured to mate with the crossbeams and/or additional standalone attachment elements can be installed to the modular assembly for connecting a passenger furnishing to a cabin floor.

Alternatively, according to some embodiments, the passenger furnishing can be connected to the crossbeams and/or additional standalone attachment elements before installation of the modular assembly for connecting a passenger furnishing to a cabin floor to the cabin floor. For example, FIG. 8 is a process flow diagram illustrating a second example process 800 for installing a passenger furnishing using a modular assembly for connecting a passenger furnishing to a cabin floor, according to various embodiments in which the passenger furnishing and modular assembly for connecting a passenger furnishing to a cabin floor are connected to channels in a cabin floor as a combined assembly.

According to at least one embodiment of the process 800, at 801, a modular assembly for connecting a passenger furnishing to a cabin floor can be assembled with a passenger furnishing, including attaching at least one crossbar to the passenger furnishing, and optionally attaching additional crossbars and or additional standalone attachment elements to the passenger furnishing. In the process 800 at 803, attachment elements (e.g., brackets for receiving the crossbars and having floor attachment elements) can be prepositioned along one or more of the crossbars attached to the passenger furnishing in locations that at least approximate the relative positions of channels in the cabin floor. At 805, the combined assembly of the passenger furnishing, crossbar(s) and brackets can then be positioned such that floor attachment elements of the brackets mate with the channels in the cabin floor. According to various embodiments, at 807, the crossbar(s) can be adjusted laterally before the brackets are tightened to secure the crossbar(s). In addition, at 809, according to some embodiments the entire combined assembly can be adjusted forward or aft along the channels before the assembly is tightened to the cabin floor.

In the following, further examples are described to facilitate the understanding of the invention:

Example A. A crossbeam assembly for mounting a passenger compartment furnishing, the assembly comprising:
a first structural member configured to span two floor-mounted channels in a passenger compartment;
first and second attachment elements that are slidingly connected with the first structural member and repositionable along the first structural member to attach to the two floor-mounted channels; and one or more furnishing attachment features connected with the first structural member and positioned to receive the passenger compartment furnishing.

Example B. The crossbeam assembly according to the preceding example, wherein the first and second attachment elements are configured to slidingly made with the two floor-mounted channels in an unsecured configuration, and to rigidly mate with the two floor-mounted channels when transitioned to a secured configuration.

Example C. The crossbeam assembly according to any one of the preceding examples, further comprising:
a second structural member configured to span at least one of the two floor-mounted channels parallel to the first structural member; and
a third attachment element slidingly connected with the second structural member and repositionable along the second structural member to attach to one of the floor-mounted channels.

Example D. The crossbeam assembly according to any one of the preceding examples, further comprising:
an additional attachment element slidingly connected with the first structural member and configured to attach to a third floor-mounted channel.

Example E. The crossbeam assembly according to any one of the preceding examples, wherein the first and second attachment elements are lockable to prevent movement of the first structural member when the first structural member is attached with the floor-mounted channels by the attachment elements.

Example F. The crossbeam assembly according to any one of the preceding examples, wherein the first structural member comprises an extruded beam.

Example G. A passenger compartment furnishing, comprising:
a crossbeam assembly comprising:
a first structural member configured to span two floor-mounted channels in a passenger compartment; and
first and second attachment elements that are slidingly connected with the first structural member, repositionable along the first structural member to mate with the two floor-mounted channels, and lockable to retain the first structural member with respect to the two floor-mounted channels when the first structural member is attached to the floor-mounted channels; and
a furnishing body mounted to the first structural member, the furnishing body comprising one or more panels configured to complement or circumscribe a portion of a passenger seat.

Example H. The furnishing according to the preceding example, wherein the first structural member is configured to span, and the first and second attachment elements are configured to attach, to two floor-mounted channels of a passenger aircraft compartment.

Example I. The furnishing according to any one of the preceding examples, wherein the crossbeam assembly further comprises:
  a second structural member configured to run parallel to the first structural member and to span at least one of the two floor-mounted channels; and
  a third attachment element that is slidingly connected with the second structural member and configured to attach the second structural member to one of the two floor-mounted channels.

Example J. The furnishing according to any one of the preceding examples, further comprising:
  a fourth attachment element that is connected with the furnishing body and configured to attach to one of the two floor-mounted channels without connecting to one of the first structural member or second structural member.

Example K. The furnishing according to any one of the preceding examples, wherein the crossbeam assembly further comprises:
  a third attachment element that is slidingly connected with the first structural member and configured to attach to a third floor-mounted channel.

Example L. The furnishing according to any one of the preceding examples, wherein the first structural member comprises an extruded beam comprising one of an oval, square, rectangular, rounded square, or rounded rectangular cross section.

Example M. The furnishing according to any one of the preceding examples, wherein the first and second attachment elements are movable along the first structural member to span a width that can range from less than 2.5 cm to at least 165 cm (1" to 66").

Example N. The furnishing according to any one of the preceding examples, wherein the first structural member comprises an extruded metal beam comprising one of an aluminum alloy, steel alloy, titanium alloy, polymer composite, or magnesium alloy.

Example O. The furnishing according to any one of the preceding examples, wherein the furnishing body comprises a shell configured to partially circumscribe a passenger seat.

Example P. The furnishing according to any one of the preceding examples, wherein the furnishing body comprises a passenger seat or passenger seat frame.

Example Q. A method of installing a passenger compartment furnishing, comprising:
  with a crossbeam assembly comprising:
    a first structural member configured to span two floor-mounted channels in a passenger compartment; and
    first and second attachment elements that are slidingly connected with the first structural member;
  positioning the first and second attachment elements along the first structural member to match a spacing of two floor-mounted channels of a passenger compartment;
  attaching the crossbeam assembly to the two floor-mounted channels via the first and second attachment elements; and
  mounting the passenger compartment furnishing to the first structural member.

Example R. The method according to the preceding example, further comprising:
  after attaching the crossbeam assembly to the two floor-mounted channels, locking the first and second attachment elements to the first structural member such that lateral motion of the first structural member relative to the two floor-mounted channels is prevented.

Example S. The method according to any one of the preceding examples, further comprising:
  positioning a second structural member at a predetermined distance forward or aft of the first structural member;
  attaching the second structural member to at least one of the two floor-mounted channels via a third attachment element; and
  mounting the passenger compartment furnishing to the second structural member in addition to the first structural member.

Example T. The method according to any one of the preceding examples, further comprising:
  repositioning one of the first attachment element or the second attachment element along the first structural member to adjust a spacing between the first and second attachment elements to match the spacing of the two floor-mounted channels.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A crossbeam assembly for mounting a passenger compartment furnishing, the assembly comprising:
  a first structural member configured to span two floor-mounted channels in a passenger compartment;
  first and second attachment elements that are slidingly connected with the first structural member and repositionable along the first structural member to attach to the two floor-mounted channels, each of the first and second attachment elements comprising, on a first side, a securing bolt and, on a second side, a footing, wherein the securing bolt is loosenable to permit the respective attachment element to open to allow adjustment of spacing of the first and second attachment elements along the first structural member and tightenable to rigidly connect the respective attachment element in position along the first structural member, wherein the footing is attachable to a floor connector, wherein the each of the first and second attachment elements are shaped to receive the first structural member; and
  one or more furnishing attachment features connected with the first structural member and positioned to receive the passenger compartment furnishing.

2. The crossbeam assembly of claim 1, wherein the first and second attachment elements are configured to slidingly mate with the two floor-mounted channels in an unsecured configuration, and to rigidly mate with the two floor-mounted channels when transitioned to a secured configuration.

3. The crossbeam assembly of claim 1, further comprising:

a second structural member configured to span at least one of the two floor-mounted channels parallel to the first structural member; and a third attachment element slidingly connected with the second structural member and repositionable along the second structural member to attach to one of the floor-mounted channels.

4. The crossbeam assembly of claim 1, further comprising:

an additional attachment element slidingly connected with the first structural member and configured to attach to a third floor-mounted channel.

5. The crossbeam assembly of claim 1, wherein the first and second attachment elements are lockable to prevent movement of the first structural member when the first structural member is attached with the floor-mounted channels by the attachment elements.

6. The crossbeam assembly of claim 1, wherein the first structural member comprises an extruded beam.

7. A passenger compartment furnishing, comprising:
a crossbeam assembly comprising:
a first structural member configured to span two floor-mounted channels in a passenger compartment; and
first and second attachment elements that are slidingly connected with the first structural member, wherein each of the first and second attachment elements comprises, on a first side, a securing bolt and on a second side, a footing, wherein the securing bolt is loosenable to permit the respective attachment element for repositioning along the first structural member to a position in which the first and second attachment elements are aligned to mate with the two floor-mounted channels, wherein the securing bolt is tightenable to rigidly connect the respective attachment element in position along the first structural member, and wherein each of the first and second attachment elements are lockable to retain the first structural member with respect to the two floor-mounted channels when the first structural member is attached to the floor-mounted channels, and wherein the footing is attachable to a floor connector, wherein the each of the first and second attachment elements are shaped to receive the first structural member; and
a furnishing body mounted to the first structural member, wherein the furnishing body is configured to complement or circumscribe a portion of a passenger seat.

8. The furnishing of claim 7, wherein the first structural member is configured to span, and the first and second attachment elements are configured to attach, to two floor-mounted channels of a passenger aircraft compartment.

9. The furnishing of claim 7, wherein the crossbeam assembly further comprises:
a second structural member configured to run parallel to the first structural member and to span at least one of the two floor-mounted channels; and
a third attachment element that is slidingly connected with the second structural member and configured to attach the second structural member to one of the two floor-mounted channels.

10. The furnishing of claim 9, further comprising:
a fourth attachment element that is connected with the furnishing body and configured to attach to one of the two floor-mounted channels without connecting to one of the first structural member or second structural member.

11. The furnishing of claim 7, wherein the crossbeam assembly further comprises:
a third attachment element that is slidingly connected with the first structural member and configured to attach to a third floor-mounted channel.

12. The furnishing of claim 7, wherein the first structural member comprises an extruded beam comprising one of an oval, square, rectangular, rounded square, or rounded rectangular cross section.

13. The furnishing of claim 7, wherein the first and second attachment elements are movable along the first structural member to span a width that ranges from less than 2.5 cm to at least 165 cm (1" to 66").

14. The furnishing of claim 7, wherein the first structural member comprises an extruded metal beam comprising one of an aluminum alloy, steel alloy, titanium alloy, polymer composite, or magnesium alloy.

15. The furnishing of claim 7, wherein the furnishing body comprises a shell configured to partially circumscribe a passenger seat.

16. The furnishing of claim 7, wherein the furnishing body comprises a passenger seat or passenger seat frame.

17. A method of installing a passenger compartment furnishing, comprising:
with a crossbeam assembly comprising:
a first structural member configured to span two floor-mounted channels in a passenger compartment; and
first and second attachment elements that are slidingly connected with the first structural member and each comprising, on a first side, a securing bolt and, on a second side, a footing, wherein the securing bolt is loosenable to allow adjustment of spacing of the first and second attachment elements along the first structural member and tightenable to rigidly connect the respective attachment element in position along the first structural member, wherein the footing is attachable to a floor connector, wherein the each of the first and second attachment elements are shaped to receive the first structural member;
positioning, with at least one of the securing bolts loosened, the first and second attachment elements along the first structural member to match a spacing of two floor-mounted channels of a passenger compartment;
rigidly connecting the first and second attachment elements with the first structural member by tightening one or more of the securing bolts;
attaching the crossbeam assembly to the two floor-mounted channels via the first and second attachment elements; and
mounting the passenger compartment furnishing to the first structural member.

18. The method of claim 17, further comprising:
after attaching the crossbeam assembly to the two floor-mounted channels, locking the first and second attachment elements to the first structural member such that lateral motion of the first structural member relative to the two floor-mounted channels is prevented.

19. The method of claim 17, further comprising:
positioning a second structural member at a predetermined distance forward or aft of the first structural member;
attaching the second structural member to at least one of the two floor-mounted channels via a third attachment element; and
mounting the passenger compartment furnishing to the second structural member in addition to the first structural member.

20. The method of claim 17, further comprising:
repositioning one of the first attachment element or the second attachment element along the first structural member to adjust a spacing between the first and second attachment elements to match the spacing of the two floor-mounted channels.

\* \* \* \* \*